B. O. CUMMINGS & D. S. McARTHUR.
PLOW.
APPLICATION FILED DEC. 10, 1914.
1,149,811.
Patented Aug. 10, 1915.
2 SHEETS—SHEET 1.
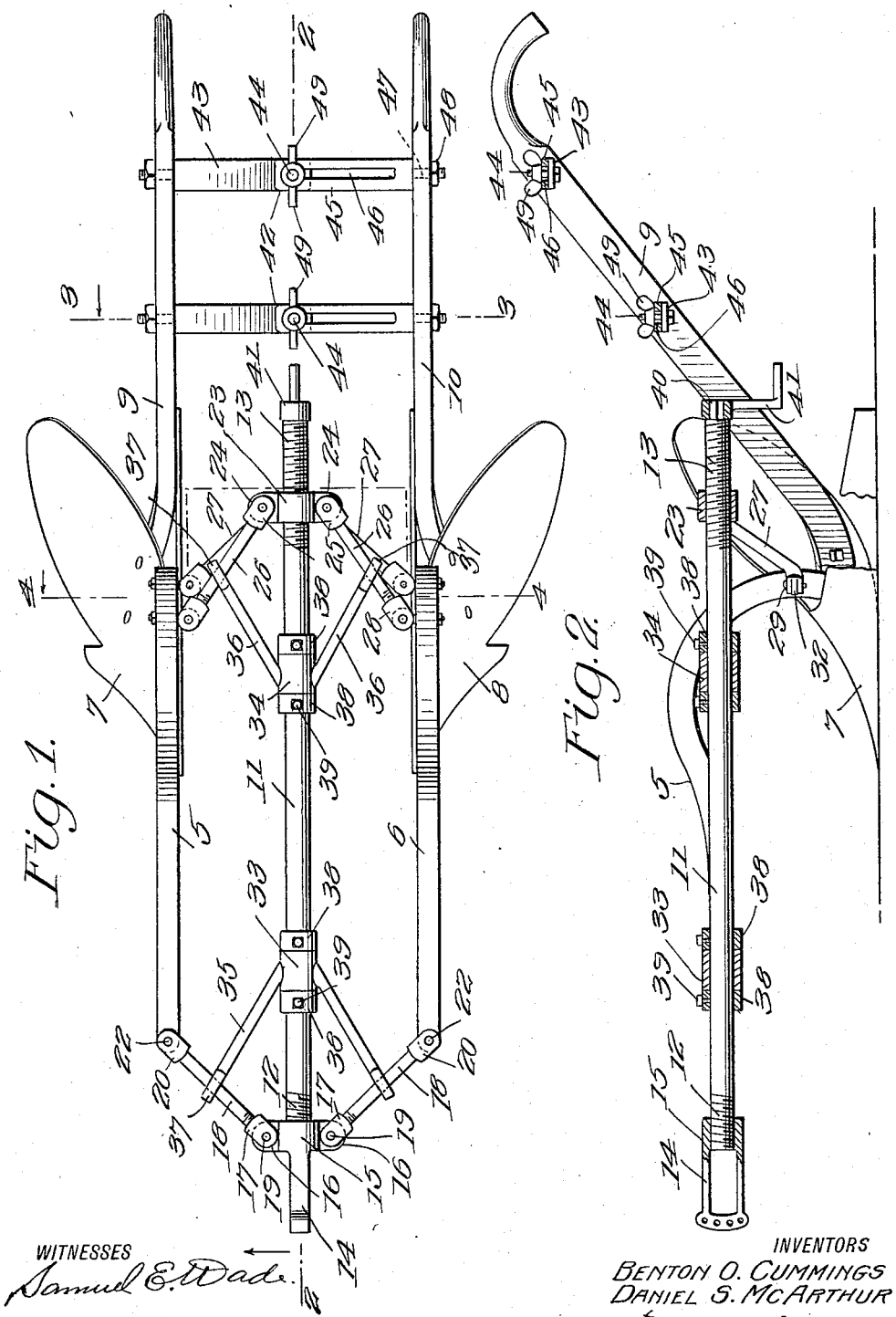
WITNESSES
INVENTORS
BENTON O. CUMMINGS
DANIEL S. McARTHUR
ATTORNEYS B. O. CUMMINGS & D. S. McARTHUR.
PLOW.
APPLICATION FILED DEC. 10, 1914.
1,149,811.
Patented Aug. 10, 1915.
2 SHEETS—SHEET 2.
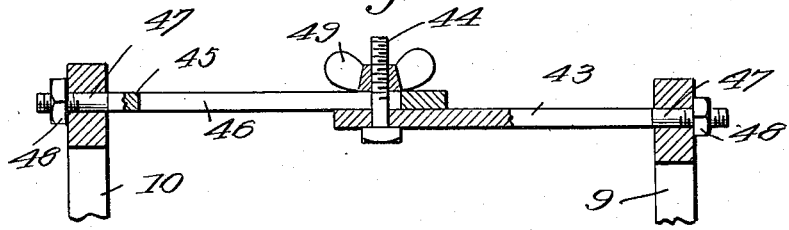
Fig. 3.
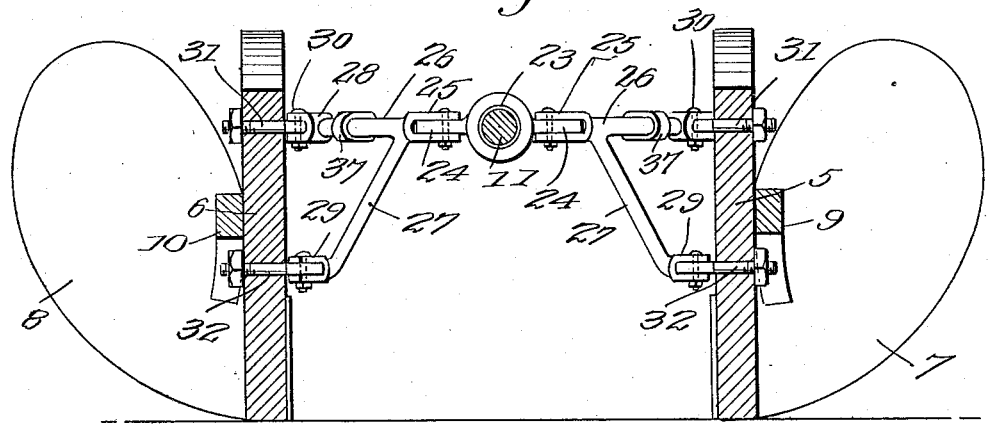
Fig. 4.
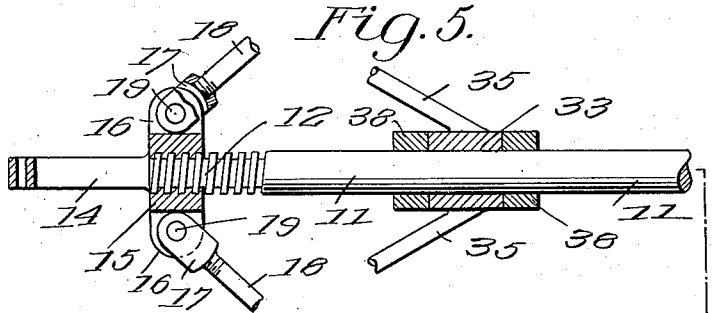
Fig. 5.
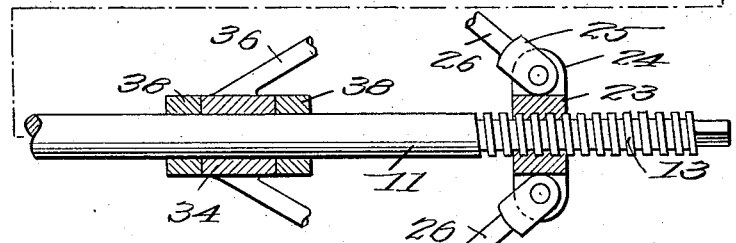
WITNESSES
Samuel E. Dade.
Alan F. Garner.
INVENTORS
BENTON O. CUMMINGS
DANIEL S. McARTHUR
BY Munn & Co.
ATTORNEYS

UNITED STATES PATENT OFFICE.

BENTON O. CUMMINGS AND DANIL S. McARTHUR, OF PORTLAND, ARKANSAS.

PLOW.

1,149,811.

Specification of Letters Patent.

Patented Aug. 10, 1915.

Application filed December 10, 1914. Serial No. 876,428.

*To all whom it may concern:*

Be it known that we, BENTON O. CUMMINGS and DANIL S. McARTHUR, citizens of the United States, and residents of Portland, in the county of Ashley and State of Arkansas, have invented certain new and useful Improvements in Plows, of which the following is a specification.

This invention relates to an improvement in agricultural implements and more particularly to an improvement in plows.

One of the principal objects of the invention is to provide a mechanism for adjustably connecting together a pair of light turning plows whereby the work ordinarily done by two men may, in the same length of time, be accomplished by one man.

Another object of the invention is to provide an improved mechanism or device by means of which light turning plows or similar implements may be adjustably connected together, and which will be extremely simple, durable, efficient in operation and inexpensive to manufacture, and which may be readily and quickly manipulated for adjustably positioning the plows relatively to each other.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a top plan view of a plow constructed according to our invention. Fig. 2 represents a vertical longitudinal sectional view taken on the plane indicated by the line 2—2 of Fig. 1. Fig. 3 represents a vertical transverse sectional view taken on the plane indicated by the line 3—3 of Fig. 1. Fig. 4 represents a vertical transverse sectional view taken on the plane indicated by the line 4—4 of Fig. 1. Fig. 5 represents a detail plan view partially in section of the adjusting shaft and adjacent parts.

Referring more particularly to the drawing, 5 and 6 represent a pair of plow beams having curved rear ends to which oppositely disposed light turned plows 7 and 8 respectively are secured. Secured in a suitable manner to the mold board of the plows are handles 9 and 10 respectively.

Included in the improved mechanism for connecting the plow beams, is a central adjusting shaft 11 having left and right hand threaded front and rear ends 12 and 13 respectively. A clevis 14 having a left hand threaded collar 15 is provided and is turned upon the forward end of the shaft. The collar 15 is provided with a pair of opposite extending ears 16, to which the inner yokes 17 of the front adjusting arms 18 are pivoted as at 19. Yokes 17 straddle ears 16 as indicated whereby they may swing in a horizontal plane relatively to the ears. Said yokes are provided with threaded openings in which the inner threaded ends of arms 18 are turned. The outer ends of front adjusting arms 18 have yokes 20 fixed thereon. These yokes straddle and are pivoted to the front ends of the plow beams as at 22.

A right hand threaded collar 23 provided with oppositely extending ears 24 is turned upon the rear end of adjusting shaft 11. Pivoted upon ears 24 are the inner end yokes 25 of the rear adjusting arms. These arms comprise upper and lower bars 26 and 27, formed integrally with each other and with the inner yokes 25. The upper bars extend in a horizontal plane while the lower bars 27 extend downwardly and away from the adjusting shaft. Threaded on the outer ends of upper bars 26 are the yokes 28. Lower bars 27 carry integral yokes 29. The yokes 28 are pivotally connected by means of bolts 30 with eye-bolts 31 carried one by each of the plow beams near their rear ends, and the yokes 29 are similarly connected to eye-bolts 32 carried one by each of the plow beams. The eye-bolts 31 lie in a common horizontal plane with the upper bars 26 and the adjusting shaft, while bolts 32 and yokes 29 lie in a plane below the first said plane.

Slidably disposed upon the adjusting shaft between collars 15 and 23, are the sleeves 33 and 34 respectively. The sleeves each carry a pair of rigid brace arms 35 and 36 respectively. Brace arms 35 extend forwardly from their sleeve while arms 36 extend rearwardly from theirs. The arms of each pair diverge toward their outer ends and are provided at their outer ends with eyes 37. Through the eyes carried by the forward brace arms 35, adjusting arms 18 extend, and the upper bars 26 of the rear adjusting arms extend through the eyes carried by brace arms 36. The eyes are of such a diameter that the adjusting arms may fit somewhat loosely therein. Sleeves 33 and 34 are maintained in adjusted position upon shaft 11 by means of collars 38, a pair of which is disposed relatively to each sleeve 33 and 34 and are secured upon the shaft one to the front of and one to the rear of said sleeves by means of the set screws 39. Collars 38 are disposed upon the shaft so as to let the same rotate relatively to the sleeves. The rear end of shaft 11 is squared as at 40 and a crank 41 is provided whereby the shaft may be turned in one direction or another.

From the foregoing description it will be evident that upon turning the adjusting shaft in one direction collars 15 and 23 will be moved relatively away from each other, thus drawing the plow beams 5 and 6 toward each other, and that upon reverse movement of the adjusting shaft, said collars 15 and 23 will be moved toward each other, thus shifting beams 5 and 6 relatively away from each other. By reason of the loose connection between the eyes 37 and the various adjusting arms, these arms will have the necessary movement incident to the relative movement of sleeves 15 and 23. At the same time the brace arms will serve to brace the adjusting arms and will give the desired rigidity to the apparatus. The handles 9 and 10 are provided with a pair of spaced adjusting means indicated generally at 42, and by means of which the handles may be secured in adjusted position relatively to each other. Each adjusting means comprises a flattened bar 43 carrying a threaded bolt 44, and a flattened bar 45 provided with a central longitudinal slot 46. Bars 43 and 45 are secured each to one of the handles by means of the threaded shanks 47 which extend through said handles and upon which the nuts 48 are turned for securing the bars in position. Bolt 44 extends through the slot 46 and is provided with a wing nut 49 whereby the bar 45 may be tightened against bar 43 for securing the bars in adjusted relative position as will be readily understood. By having sleeves 33 and 34 adjustably positioned upon shaft 11, the initial inclination of the adjusting arms and hence the initial relative position of the plow beams may be varied.

Although we have described the preferred embodiment of our invention, we may desire to make such changes in the construction, combination and arrangement of parts thereof as do not depart from the spirit of the invention and the scope of the appended claims.

We claim:—

1. The combination with a pair of spaced plow beams provided with oppositely disposed plows and with handles, of an adjusting shaft disposed between the plow beams in parallel relation thereto, said shaft having its ends threaded in opposite directions, a clevis provided with a winged threaded sleeve portion turned upon the forward end of said shaft, and a winged threaded sleeve turned upon the rear end thereof, front adjusting arms pivotally connected at their inner ends to the winged collar portion of the clevis, and pivotally connected at their outer ends to the forward portions of the plow beams, rear adjusting arms pivotally connected at their inner ends to said winged collar, said rear adjusting arms including upper and lower branches pivotally connected at spaced points to the plow beams, sleeves adjustably disposed upon said shaft and provided with spreading arms, means whereby the sleeves may be maintained in adjusted position on the shaft, and loose connections between the spreading arms and adjusting arms whereby said spreading arms may brace said adjusting arms.

2. The combination with a pair of spaced plow beams provided with oppositely disposed plows and with handles, of an adjusting shaft disposed between the plow beams in parallel relation thereto, said shaft having its ends threaded in opposite directions, a clevis provided with a winged threaded sleeve portion turned upon the forward end of said shaft, and a winged threaded sleeve turned upon the rear end thereof, front adjusting arms pivotally connected at their inner ends to the winged collar portion of the clevis, and pivotally connected at their outer ends to the forward portions of the plow beams, rear adjusting arms pivotally connected at their inner ends to said winged collar, said rear adjusting arms including upper and lower branches pivotally connected at spaced points to the plow beams, means adjustably disposed upon said shaft and having loose connection with the adjusting arms whereby to brace them, and means whereby said adjusting shaft may be rotated at will.

3. The combination with a pair of spaced plow beams, of a shaft oppositely threaded at its ends, sleeves turned upon the front and rear ends of the shaft, adjusting arms pivotally connected at their inner ends to said sleeves and at their outer ends to the plow beams, the adjusting arms connecting the rear sleeve with the plow beams being branched and pivotally connected at their outer ends to said beams at spaced points, means adjustably disposed upon the shaft for bracing the adjusting arms, and means for rotating the shaft at will.

4. The combination with a pair of spaced plow beams, of an adjusting shaft disposed between said beams and parallel thereto, and co-acting means between the plow beams and shaft, whereby the former may be moved toward or away from the latter as the shaft is rotated, said means including a sleeve threaded on said shaft at one end and provided with oppositely disposed ears, adjusting arms including each an upper and a lower bar, said adjusting arms provided at their inner ends with yokes and pivotally connected thereto the upper arms of the upper bars of said adjusting arms having yokes threaded on the outer ends thereof and pivotally connected to the plow beams, the lower bars of the adjusting arms being provided with yokes pivotally connected to the plow beams, and means adjustably disposed upon said shaft for bracing said adjusting arms.

5. The combination with a pair of spaced plow beams, of an adjusting shaft disposed between and parallel to them, and having oppositely threaded ends, sleeves turned upon the opposite ends of the shaft, adjusting arms pivotally connected at their inner ends to the sleeves and at their outer ends to the plow beams, means adjustable on the shaft for bracing the adjusting arms, and means for rotating said shaft at will.

6. The combination with a pair of spaced parallel plow beams of adjusting arms pivotally connected at their outer ends to said beams, spaced elements to which the inner ends of the arms are connected, means whereby said spaced elements may be moved toward or away from each other at will, and co-acting means between last said means and said adjusting arms for bracing the latter.

BENTON O. CUMMINGS.
DANIL S. McARTHUR.

Witnesses:
S. L. ADAMS,
F. E. HALLOWAY.

Copies of this patent may be obtained for five cents each, by addressing the "Commissioner of Patents, Washington, D. C."